INVENTOR.

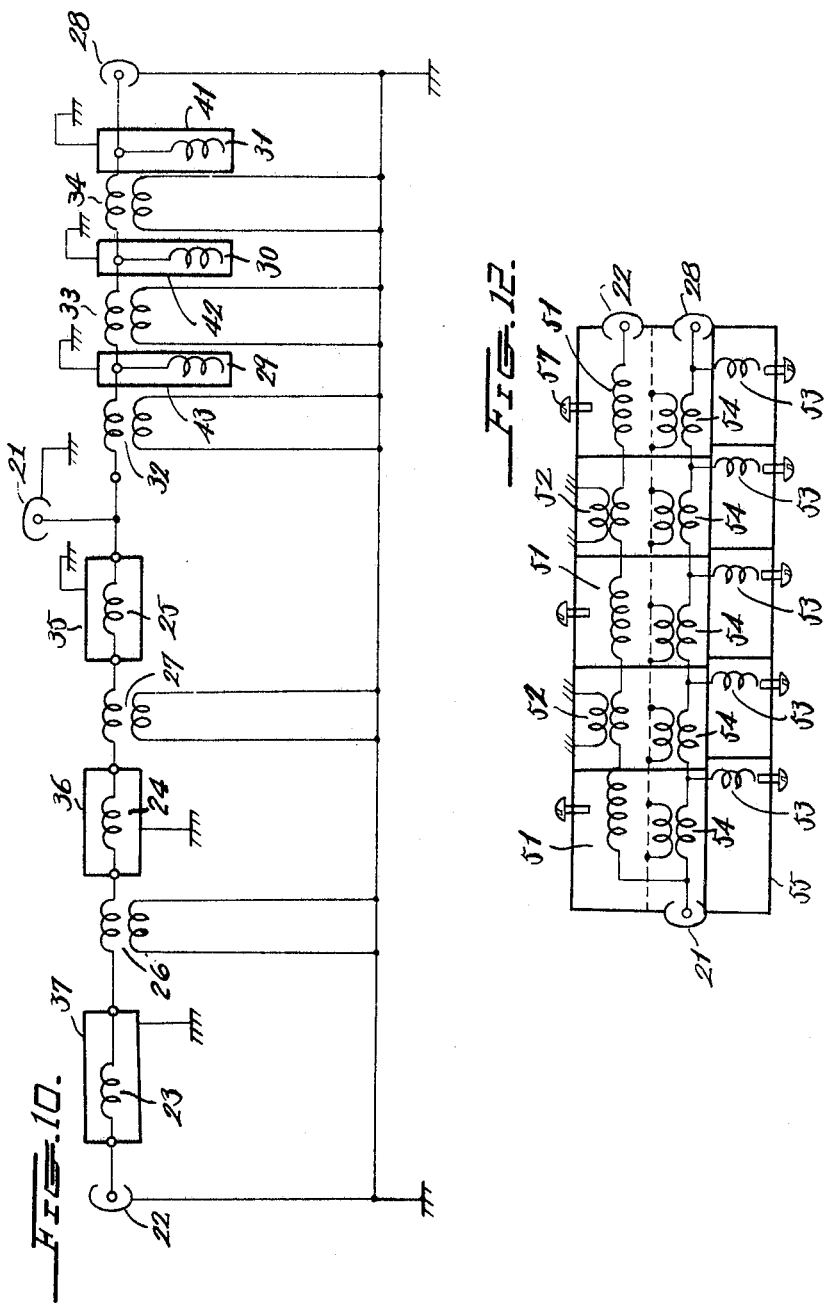

United States Patent Office 3,504,317
Patented Mar. 31, 1970

3,504,317
BRANCHING FILTER COMPRISING A BAND-PASS FILTER AND A BAND-REJECTION FILTER
Risaburo Sato, 50 Nakajima-cho, Sendai-shi, Miyagi-ken, Japan, and Senji Yokokawa, Bangaichi, Oguni-machi, Kami-hanazawa, Yonezawa-shi, Yamagata-ken, Japan
Filed June 19, 1967, Ser. No. 647,133
Int. Cl. H01p 5/12
U.S. Cl. 333—6
5 Claims

ABSTRACT OF THE DISCLOSURE

A branching filter comprising a band-pass filter and a band-rejection filter connected in parallel at the input, the former being formed of shielded coils and bifilar coils connected in series, the latter being formed of shielded coils open at one end and shunted from bifilar coils, the bifilar coils in both filters severing as phase shifters.

---

The present invention relates to branching filters, in general, and to branching filters in TV signal reception for branching a predetermined signal from many other signals broadcast in a plurality of frequency channels in particular.

Heretofore, many branching filters for the VHF band have been formed of distributed constant circuits formed by coaxial cables. Although those branching filters exhibit good frequency characteristics and were certainly useful where large power was desired, long coaxial cables were required. Therefore such branching filters consequently were not suitable when small-sized filters were desired.

It is one object of the present invention to provide a branching filter of a very small size having superior frequency characteristic as well as offering ease of operation.

It is another object of the present invention to provide a band-pass filter, as a part of a branching filter, having a satisfactory band width and desirable attenuation characteristics comprising a band-pass filter circuit unit including a shielded coil with a length of ½ wavelength at substantially the center frequency in the pass band, the shielded coil being connected in series with one inductor of a bifilar coil, and the other inductor of the bifilar coil being grounded on both ends. The bifilar coil has a length of slightly above or below ¼ wavelength at substantially the center frequency in the pass band and serves as a phase shifter.

It is still another object of the present invention to provide a band-rejection filter, as the other part of a branching filter, having a satisfactory band width and desirable attenuation characteristics comprising band-rejection filter circuit unit comprising a shielded coil open at one end and having a length of ¼ wavelength at substantially the center frequency in the rejection band, the shielded coil shunted from one inductor of a bifilar coil, the other inductor of the bifilar coil being grounded on both ends, and the bifilar coil having a length of ¼ wavelength at substantially the center frequency in the rejection band and serving as a phase shifter.

It is yet still another object of the present invention to achieve a desirable band width and an attenuation effect of the band-pass or rejection filter, respectively, formed of two, or more than two units, of band-pass or rejection filter circuits connected in series.

It is a feature of the present invention to make use of the fact that a band-pass filter has its pass band in the frequency where the length of the shielded coil corresponds to half a wavelength adjacent the center frequency, as well as to the fact that the greater the characteristic impedance of the shielded coil, compared with the value of the load impedance, the greater does the band-pass filter exhibit a sharp attenuation effect on all the frequencies except near the center frequency in the pass band.

A further feature of the invention is the utilization of a bifilar coil as a phase shifter. A bifilar coil of the branching filter according to the present invention is grounded on both ends of one inductor thereof. When the bifilar coil is shorter than ¼ wavelength of the center frequency, the pass band spreads to the higher frequencies. On the other hand, when it is longer than ¼ wavelength, the pass band spreads to the lower frequencies, whereas the pass band width may be widened by changing the length of the bifilar coil.

A still further feature of the invention is a desirable attenuating function of a shielded coil, open at one end, in the band-rejection filter. This coil has a characteristic impedance far greater than the value of the load impedance and substantially is short-circuited in the frequency band when the length of the shielded coil corresponds to a quarter of the wavelength of the center frequency thereof. No signal, as a result, will be supplied to the output of the band-rejection filter. A sharp attenuating effect will be achieved in one selected frequency, which constitutes the rejection band.

A yet further feature of the present invention is to provide regulation screws, respectively, for a shielded-coil in the band-pass filter and for a shielded coil open at one end in the band-rejection filter so as to easily regulate each pass or rejection band width and to produce an attenuation effect as well.

With these and other objects in view, which will become apparent in the following detailed description, the present invention will be clearly understood in connection with the accompanying drawings, in which:

FIG. 10 is a schematic circuit diagram showing a preferred embodiment of a branching filter according to the present invention;

Figure 11A:
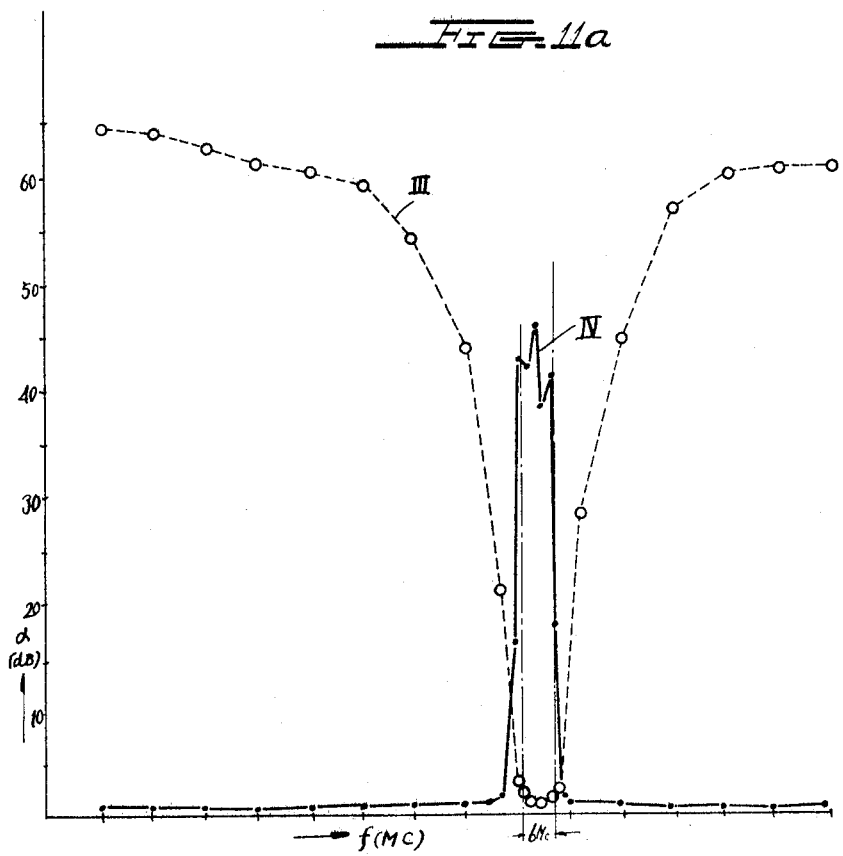
Figure 13A:
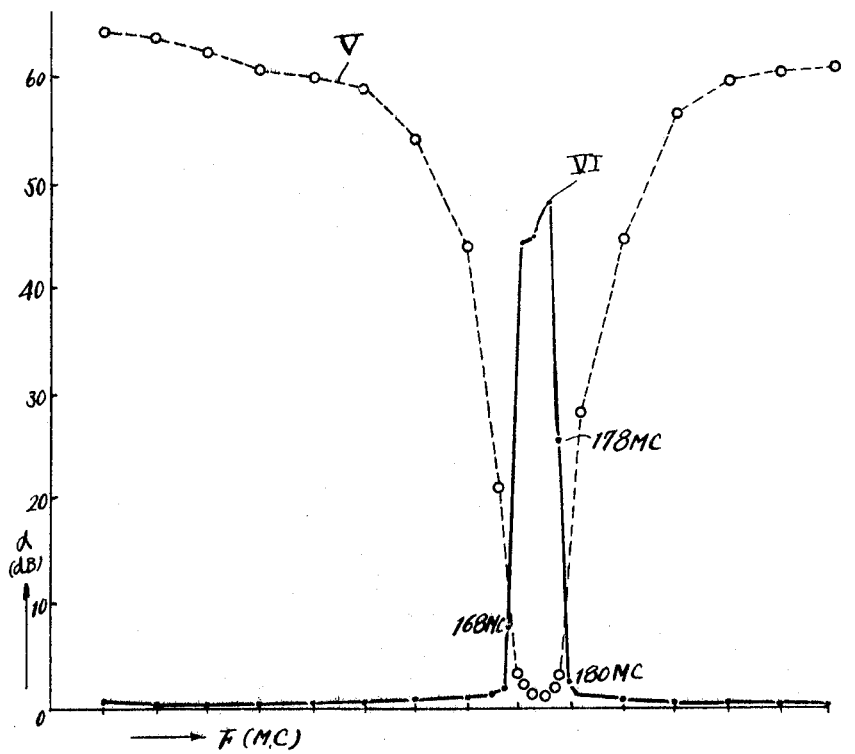
Figure 13B:
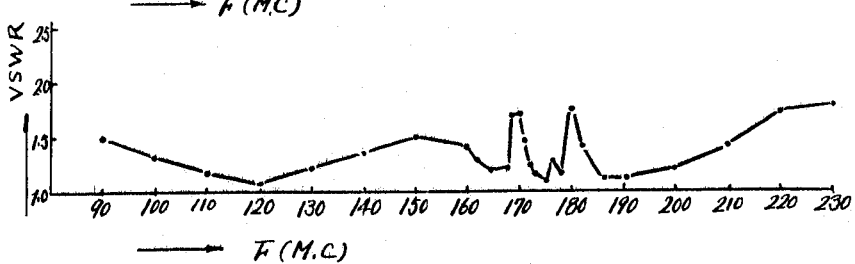

FIGS. 11a and b are graphs showing the frequency responses of the branching filter illustrated in FIG. 10;

FIG. 12 is a schematic circuit diagram showing another preferred embodiment of the present invention, and FIGS. 13a and 13b are graphs showing the frequency responses of the branching filter illustrated in FIG. 12.

Figure 1:
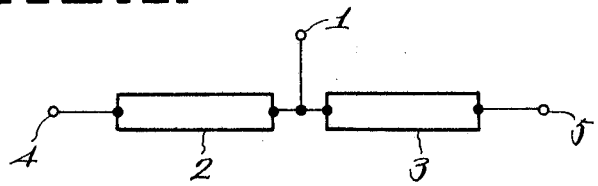
FIGURE 1 is a block diagram of a branching filter comprising a band-pass filter and a band-rejection filter connected in parallel at the input terminal.
Figure 2:
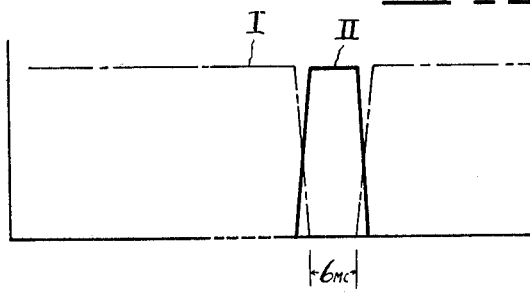
FIG. 2 is a graph showing the attenuation effects of the branching filter illustrated in FIG. 1.

Referring to the drawings and more particularly to FIGS. 1 and 2, a branching filter basically comprises a band-pass filter 2 and a band-rejection filter 3 connected with each other in parallel at the input terminal 1. A plurality of signals from many TV broadcast channels are initially received at the input terminal 1. All signals leave output 5 of the band-rejection filter 3 except one selected signal which appears at output 4 of the band-pass filter 2. A desirable attenuation characteristics of a branching filter as shown in FIG. 1 is illustrated in FIG. 2, wherein I is an attenuation characteristic of the band-pass filter 2 and II is that of the band-rejection filter 3. The pass or rejection band width is about 6 mc.

Figure 3:
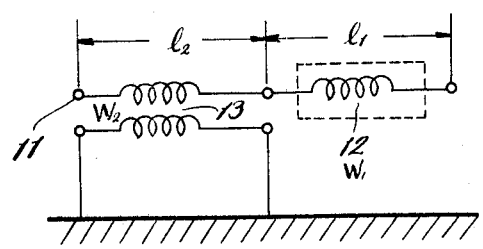
FIG. 3 is a schematic circuit diagram of a band-pass unit filter circuit according to the present invention.

A unit of band-pass filter circuit according to the invention is shown in FIG. 3. This filter comprises a bifilar coil 13 having a length of $l_2$ which is connected in series with a shielded coil 12 of a length of $l_1$. The dashed rectangular box in FIG. 3 indicates that the coil is "shielded." The bifilar coil 13 has a balance line transmission characteristic impedance $W_2$, and the shielded coil has a characteristic impedance $W_1$. One inductor of the bifilar coil is grounded on both ends, while the other inductor of the bifilar coil is connected to the input terminal 11 at one end to the shielded coil 12 at the other end.

The bifilar coil, when its length $l_2$ is a quarter of a wavelength at substantially the center frequency in the pass-band, electrically achieves the same function as the following circuit: a coupled circuit comprising one each of balance and unbalance line transmission circuits connected in parallel by use of two ideal transformers with a coupling ratio of 2 to 1 (balance line to unbalance line 2:1). In the coupled circuit, since the characteristic impedance of the unbalance line transmission becomes far greater than that of the balance line transmission, only the balance line transmission operates in substance. The bifilar coil in the branching filter according to the invention will be utilized as a phase shifter by regulating the value of the characteristic impedance of the balance line transmission to correspond to the value of the load impedance. A bilfiar coil in the band-rejection filter is the same.

Referring now again to FIG. 3, the characteristic impedance $W_2$ of the balance line transmission of the bifilar coil 13 equals the load impedance. In case the value of $W_1$ is far greater than the value of $W_2$:

$$W = \frac{W_1}{W_2} \gg 1$$

in which W is normalized impedance. The frequency function as to the bifilar coil 13 with a length of $l_2$ can be shown as follows (the band width we consider now is very narrow):

$$\sin \beta l_2 = v$$
$$\cos \beta l_2 = u$$
$$\xi = \tan \beta l_2 = \frac{v}{u}$$
$$\psi = 2W^\theta$$

in hich $\beta$ is a phase constant, $\theta$ is an angle variable, $v$, $u$ and $\xi$ is defined as, $\sin \beta l_2$, $\cos \beta l_2$ and $\tan \beta l_2$, respectively and $\psi$ is a replaced frequency function. In case that the length $l_1$ of the shielded coil 12 equals half a wavelength of the center frequency in the pass band:

$$l_1 = \frac{1}{2}\lambda_0$$

($\lambda_0$: wavelength of the center frequency $f_0$ in the pass band).

The frequency function as to the shielded coil 12 with a length of $l_1$ can be shown as follows:

$$\cos \beta l_1 \simeq -1$$
$$\sin \beta l_1 \simeq 2\beta l_1 = 2\theta$$

The working attenuation $\alpha$, in case $l_2 < \frac{1}{4}\lambda_0$, may be written in the following form:

$$\alpha = 10 \log_{10}\left\{1 + \frac{u^2\psi^2}{4}(2-\xi\psi)^2\right\} dB \tag{1}$$

Clearly from this Formula 1, $\alpha$ will be zero at the following two points $(f_{01}, f_{02})$:

$$f_{01} = f_0 \rightarrow \psi_{01} = 0$$
$$f_{02} = \rightarrow \psi_{02} = 2/\xi$$

Figure 4:
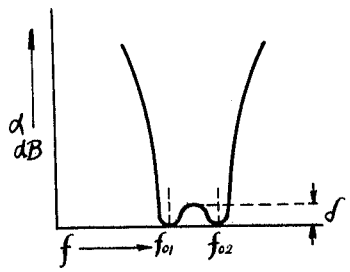
FIGS. 4 and 5 are graphs showing the attenuation effects of the band-pass filter illustrated in FIG. 3.

FIG. 4 shows the attenuation characteristic of this case.

The working attenuation $\alpha$, in case $l_2 > \frac{1}{4}\lambda_0$, may be written in the following form:

$$\alpha = 10 \log_{10}\left\{1 + \frac{u^2\psi^2}{4}(2+\xi\psi)^2\right\} dB \tag{1}'$$

Figure 5:
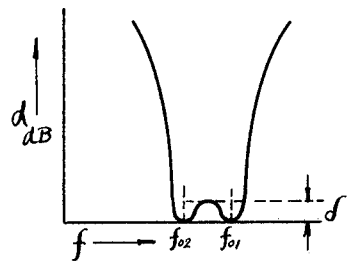

FIG. 5 shows the attenuation characteristic of this case. The point $f_{02}$ thereof changes position to the lower frequency referring to FIG. 4. $\delta$ shown in FIGS. 4 and 5 designates an allowable loss in attenuation.

One can predetermine the width of the pass band as well as allowable loss under a certain value. Accordingly the value of W (normalized impedance) and $l_2$ (length of the bifilar coil) can also be determined. The calculation of above-described Formulae 1 and $1^1$ in consequence, will be simplified.

Figure 6:
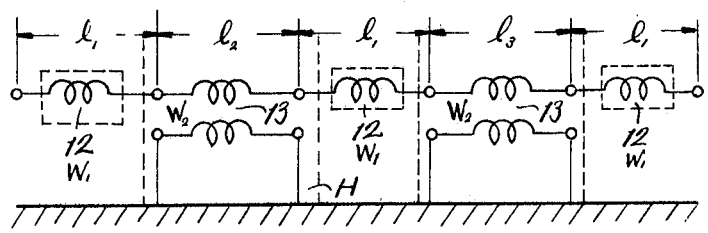
FIG. 6 is a schematic circuit diagram of a band-pass filter formed of two units of band-pass filter circuits and another shielded coil connected in series.

Referring now again to the drawings, and more particularly to FIG. 6, band-pass filter 1, is illustrated comprising two band-pass filter circuit units illustrated in FIG. 3 and another shielded coil connected in series. More particularly the band-pass filter of this form comprises three shielded coils 12 having the length of $l_1$, respectively, which corresponds to ½ a wavelength of the center frequency in the pass band ($l_1 = \frac{1}{2}\lambda_0$). Between the shielded coils two bifilar coils 13, are connected in series, one of which has a length $l_2$ slightly longer than ¼ wavelength ($l_2 > \frac{1}{4}\lambda_0$) and the other of which has a length $l_3$ which is slightly shorter than ¼ wavelength ($l_3 < \frac{1}{4}\lambda_0$).

The working attenuation $\alpha$ of the band-pass filter may be written in the following form:

$$\alpha = 10 \log_{10}\left[1 + \frac{u^4}{4}\psi^2\left\{\psi^2 - \frac{1}{\xi^2}(3 + \xi^2 + j2\xi)\right\}\right.$$
$$\left.\left\{\psi^2 - \frac{1}{\xi^2}(3 + \xi^2 - j2\xi)\right\}\right] dB \tag{1}''$$

Clearly from the Formula 1″, $\alpha$ becomes zero at the frequency $f_{01}$ and nearly zero at two frequency points $f_{02}$ and $f_{03}$:

$$f_{01} = f_0 \rightarrow \psi_{01} = 0$$
$$f_{02} \rightarrow \psi_{02} = -\left(1 + \frac{3}{\xi^2}\right)$$
$$f_{03} \rightarrow \psi_{03} = 1 + \frac{3}{\xi^2}$$

Figure 7:
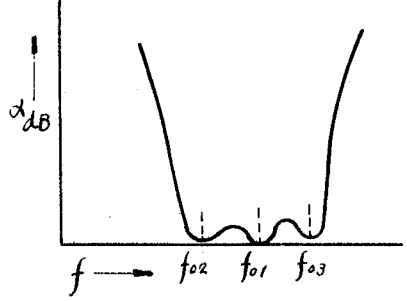
FIG. 7 is a graph showing the attenuation effect of the band-pass filter illustrated in FIG. 6.

As shown in FIG. 7, the band-pass filter of the form exhibits a desirable attenuation characteristic and a satisfactory band width.

Figure 8:
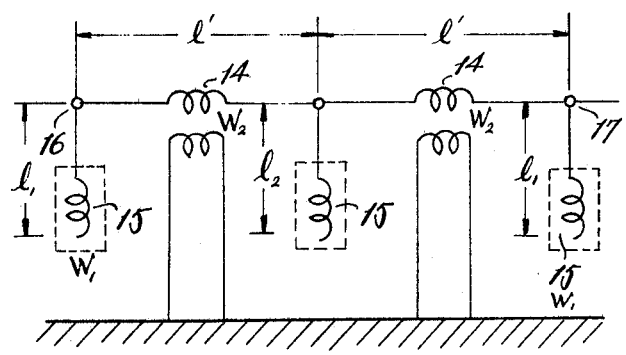
FIG. 8 is a schematic circuit diagram of a band-rejection filter formed of two units of band-rejection filter circuits and another shielded coil open at one end connected in series.

FIG. 8 shows a band-rejection filter comprising two band-rejection filter circuit units and another shielded coil which is open at one end and shunted at the input 16. A band rejection filter unit is formed of a shielded coil 15 which is open at one end and which has a length of $l_1$ or $l_2$ and is shunted from one inductor of a bifilar coil 14 with length $l'$. The other inductor of the bifilar coil is grounded at both ends. The shielded coil 15 has a characteristic impedance $W_1$, and the bifilar coil 14 has a balance line transmission characteristic impedance $W_2$.

Now in the event that the characteristic impedance $W_1$ of the shielded coil 15 is much higher than the value of the balance line transmission characteristic impedance $W_2$ of the bifilar coil 14 which equals to the value of the load impedance $$W = \frac{W_1}{W_2} \gg 1$$

and if the length of each coil is predetermined as follows:

$$\beta l' = \frac{1}{4}\lambda_0$$
$$\beta l_1 = \frac{1}{4}\lambda_{\infty 1}$$
$$\beta l_2 = \frac{1}{4}\lambda_{\infty 2}$$

in which:

$\lambda_0$ is the wavelength of the center frequency in the rejection band, $\lambda_{\infty 1}$ and $\lambda_{\infty 2}$ is the respective wavelength of the frequencies at which two peaks of infinite attenuation may appear, then the working attenuation $\alpha$ of the circuit shown in FIG. 8 may be written in the following form:

$$\alpha = 10 \log_{10}\left[\frac{1}{4}\left\{\frac{4\text{ⓑ}^6 + (b^2 + 8a)\text{ⓑ}^4 + (4a^2 - 2bc)\text{ⓑ}^2 + c^2}{W^2(\text{ⓑ}^2 - \psi^2)^2}\right\}\right] dB \quad (2)$$

in which:

$$\left(1 - \frac{f + \Delta f}{f_0}\right)\frac{\pi}{2} = \theta' - \psi'$$
$$\theta' = \left(1 - \frac{f}{f_0}\right)\frac{\pi}{2}$$
$$\psi' = \frac{\Delta f}{f_0} \cdot \frac{\pi}{2}$$
$$W\theta' = \text{ⓑ}$$
$$W\psi' = \psi$$

where, $\theta'$ designates an angle to the reference frequency, $\psi'$ a normalized angle constant on the basis of the center frequency $f_0$, $\psi$ a replaced frequency function, and ⓑ stands for $W\theta'$, $\alpha$ for $\psi^2 + W$, $b$ for $2(W+1)$, for $(2\psi^2+1)W$, $\Delta f$ aberration degree from the center frequency $f_0$.

Clearly from the above Formula 2, the peaks of infinite attenuation may be obtained at two frequency points where the denominator will be zero:

$$\text{ⓑ} = \pm \psi$$

Figure 9:
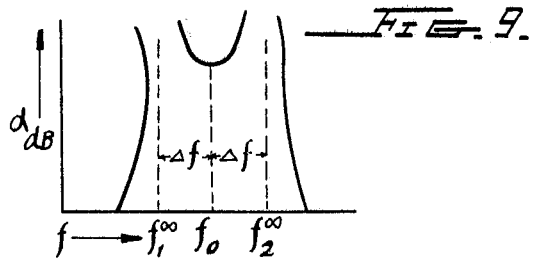
FIG. 9 is a graph showing the attenuation effect of the band-rejection filter illustrated in FIG. 8.

The band-rejection filter of the form exhibits attenuation characteristics as shown in FIG. 9. A sharp attenuation effect may be obtained if W is sufficiently large.

Two preferred embodiments of branching filter according to the present invention are illustrated in FIGS. 10 and 12. They are formed of plural band-pass and rejection filter circuit units, respectively, connected in series. The two circuits are connected in parallel at the input terminal of a branching filter.

Referring now to FIG. 10, the band-pass filter circuit comprises, between input terminal 21 and output terminal 22, the above-mentioned shielded coils 23, 24 and 25 and bifilar coils 26 and 27 connected alternately in series. The band-rejection filter circuit comprises, between input 21 and output 28, the above-mentioned shielded coils 29, 30 and 31 which are open at one end and which are shunted at each juncture between the connected bifilar coils 32, 33, 34 and the output terminal 28.

The branching filter having the following constructional elements was tested at approximately a frequency of 173 mc., the frequency characteristics of which shown in FIG. 11.

Band-pass filter:
 Cylindrical shields (35, 36, 37)
  Inner diameter—23 mm.
  Length—50 mm.
 Coils (enameled wire) (23, 24, 25)
  Diameter—0.4 mm.

The enameled wire was wound about the bobbin with a diameter of 88 mm. 41 times by a pitch of 1 mm.;

Bifilar coil 26 of enameled wire with a diameter of 0.35 mm. wound about the bobbin with a diameter of 8 mm. 15 times by a pitch of 1 mm.; and Bifilar coil 27 the same as coil 26.

Band-rejection filter:
 Cylindrical shields (41, 42, 43)
  Inner diameter—25 mm.
  Length—30 mm.;
 Coils (enameled wire) (29, 30, 31)
  Diameter—0.4 mm.;

The enameled wire was wound about the bobbin with a diameter of 8 mm. 15 times by a pitch of 1 mm.;

Bifilar coil 32 of enameled wire with a diameter of 0.35 mm. wound about the bobbin with a diameter of 8 mm. 9.5 times by a pitch of 1 mm.;

Bifilar coil 33 of enameled wire with the same diameter wound about the bobbin with the same diameter times by the same pitch; and Bifilar coil 34 the same as coil 33.

Figure 11B:
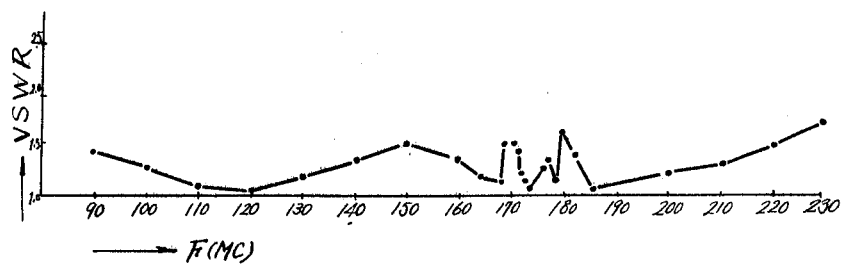

In the branching filter of this form, the VSWR may be desirably kept under 1.5 in the pass or rejection band width, as shown in the graph of FIG. 11b. The attenuation characteristics of the branching filter will be also satisfactory as shown in the graph of FIG. 11a, in which III indicates the attenuation of the band-pass filter and IV the attenuation of the band-rejection filter.

Another preferred embodiment of a branching filter according to the present invention is illustrated in FIG. 12, which comprises the same constructions of the band-pass filter as shown in FIG. 10. Five band-rejection filter circuit units are used, while three units are included in FIG. 10. All coils are respectively separated from one another by partition walls of chassis 55 so as not to have any electrical influence on adjacent coils. The regulation screws 57 are set respectively on the outer walls of the partition boxes in which the shielded coils 51 and the shielded coils 53, which are open at one end, are held. These regulations screws are used for regulating the pass or rejection band width by changing respectively the length of the coils 51 or 53.

The branching filter of this form exhibits the attenuation characteristics as illustrated by V and VI in the graph of FIG. 13a, in which V indicates the attenuation of the band-pass filter and VI that of the band-rejection filter. The VSWR of said branching filter is also satisfactory as seen in the graph of FIG. 31b.

A bifilar coil utilized in the branching filter according to the present invention may be substituted by a coaxial cable having a characteristic impedance corresponding to the value of the load impedance, with a length of ¼ wavelength of approximately the center frequency in the pass or rejection band.

While we have disclosed several embodiments of the present invention it is to be understood that these embodiments are given by example only and not in a limiting sense.

We claim:
1. A branching filter comprising
 a band-pass filter and a band-rejection filter connected in parallel at the input terminal thereof,
 said band-pass filter comprising a band-pass filter circuit unit including bifilar coil inductors and a shielded coil connected in series,
 said shielded coil having a length of ½ wavelength at substantially the center frequency in the pass band and being connected in series with one inductor of said bifilar coil, the other inductor of said bifilar coil grounded on both ends,
 said bifilar coil having a length of approximately ¼ wavelength at substantially the center frequency in the pass band and serving as a phase filter, and
 said band-rejection filter comprising a band-rejection filter circuit unit including a shielded one-end open coil,
 a second bifilar coil, including second inductors,
 said shielded one-end-open coil shunted from one of said second inductors of said second bifilar coil,
 said shielded one-end-open coil having a length of ¼ wavelength at substantially the center frequency in the rejection band, the other of said second inductors of said second bifilar coil grounded on both ends, and said second bifilar coil having a length of ¼ wavelength at substantially the center frequency in the rejection band and serving as a phase shifter.

2. The branching filter, as set forth in claim 1, wherein said band-pass filter comprises at least two of said band-pass filter circuit units connected in series.

3. The branching filter, as set forth in claim 1, wherein said band-rejection filter comprises at least two of said band-rejection filter circuit units connected in series.

4. The branching filter, as set forth in claim 1, wherein said band-pass filter comprises at least two of said band-pass filter circuit units connected in series, and said band-rejection filter comprises at least two of said band-rejection circuit units connected in series.

5. The branching filter, as set forth in claim 4, wherein said shielded coils of said band-pass filter and said shielded one-end-open coils of said band-rejection filter, respectively, include regulation screws for changing the length of said coils so as to achieve regulation of the pass or rejection band width.

References Cited

UNITED STATES PATENTS 1,854,448   4/1932   Cohen _____ 333—73 X

HERMAN KARL SAALBACH, Primary Examiner

PAUL L. GENSLER, Assistant Examiner

U.S. Cl. X.R.

333—29, 73